United States Patent [19]

Torpey

[11] 4,130,482

[45] Dec. 19, 1978

[54] WASTEWATER TREATMENT

[75] Inventor: Wilbur N. Torpey, New York, N.Y.

[73] Assignee: Autotrol Corporation, Milwaukee, Wis.

[21] Appl. No.: 811,510

[22] Filed: Jun. 30, 1977

Related U.S. Application Data

[63] Continuation of Ser. No. 749,542, Dec. 10, 1976, abandoned, which is a continuation of Ser. No. 602,578, Aug. 7, 1975, abandoned.

[51] Int. Cl.² ............................................. C02C 1/04
[52] U.S. Cl. ................................................... 210/17
[58] Field of Search ......................... 210/17, 150, 151

[56] References Cited

U.S. PATENT DOCUMENTS 3,817,857   6/1974   Torpey .................................. 210/17

OTHER PUBLICATIONS

Torpey et al., "Effects of Exposing Slimes on Rotating Discs to Atmospheres Enriched with Oxygen," Presented at Sixth International Conference – Advances in Water Pollution Research, held in Jerusalem, Jun. 8–23, 1972.

Primary Examiner—Thomas G. Wyse
Attorney, Agent, or Firm—Quarles & Brady

[57] ABSTRACT

A method of wastewater treatment employing multistage, partially submerged, rotating contactors wherein at least the attached biological slimes on the surfaces of the contactors in the first two stages are exposed to an oxygen enriched gaseous environment and the slime surfaces on each stage are supplied with wastewater at a filtrate $BOD_5$ loading rate from about 3 to about 10 pounds per day per 1,000 square feet of contactor surface area.

2 Claims, 4 Drawing Figures

WASTEWATER TREATMENT

This is a continuation of application Ser. No. 749,542, filed Dec. 10, 1976, which was a continuation of application Ser. No. 602,578, filed Aug. 7, 1975, both now abandoned.

BACKGROUND AND PRIOR ART

The present invention relates to the biological removal of carbonaceous matter and other pollutants from wastewater. More specifically, the invention provides a method for the treatment of wastewater utilizing partially submerged rotatable biological contactors to effect the removal of an optimum amount of carbonaceous matter per unit area of surface provided in the form of biological contactors. Further, the invention provides operating parameters for minimizing the size of a wastewater treatment plant employing rotating biological contactors for the removal of a desired amount of carbonaceous matter.

The concentration of carbonaceous pollutants in wastewater in usually expressed in terms of $BOD_5$ (biochemical oxygen demand) which is a term commonly known and used in wastewater treatment. "$BOD_5$" is the amount of molecular oxygen consumed by a fluid under predetermined established conditions at 68° F. during a 5 day period expressed in terms of (mg/liter). "Filtrate $BOD_5$" is used to express the amount of soluble and colloidal carbonaceous matter present in the wastewater after filtration of all particles larger than about 0.5 micron. The expression, "filtrate $BOD_5$ loading rate," is used herein to express the amount of such filtrate $BOD_5$ supplied per day per 1,000 square feet of contactor surface i.e. (lbs/day/1,000 sq. ft).

The use of rotatable biological contactors that are partially submerged in the wastewater and rotated at a predetermined rate to alternately expose the surface upon which biological slimes grow to the atmosphere and immerse them in the wastewater are well known. Representative U.S. patents disclosing treatment systems employing rotating contactors to grow biological slimes on the contactor surface are Torpey U.S. Pat. No. 3,575,849; El Naggar U.S. Pat. No. 3,335,081; Simpson U.S. Pat. No. 3,466,241; and Hartman et al U.S. Pat. No. 3,389,798 among others. Although rotating contactor treatment systems are very effective and efficient in removing carbonaceous pollutants from wastewater in cold weather, i.e., a wastewater temperature of less than about 60° F., their efficiency may be substantially reduced during warm weather, i.e., a wastewater temperature of more than about 60° F. since deleterious organisms such as *beggiatoa* and other filamenteous organisms that do not consume carbonaceous material, proliferate and successfully displace carbonaceous consuming organisms from the contactor surface area. Consequently, a substantial portion of the contactor surface area is lost to the oxidation of reduced sulphur compounds rather than the removal of carbonaceous pollutants.

It is a primary objective of the invention to provide a wastewater treatment system of the foregoing type wherein such growth of deleterious organisms on the contactor surface is eliminated during warm weather operation. It is further an objective of the invention to define operating parameters for a treatment system utilizing rotating contactors wherein the contactor surface area required for a desired $BOD_5$ removal is minimized.

SUMMARY OF THE INVENTION

The foregoing and other objectives of the invention are achieved by providing an oxygen enriched gaseous atmosphere above the wastewater in the treatment unit, and supplying the unit at a filtrate $BOD_5$ loading rate within a specific range, to be hereinafter defined. According to the invention, a wastewater treatment system, including at least two and preferably three or four stages in series is provided. Each stage includes a well or trough through which a single rotatable shaft extends in a direction generally transverse to the direction of wastewater flow through the well. Each rotatable shaft supports a plurality of contactors, spaced along its length.

The system is supplied with wastewater to form a level in the wells that is preferably slightly below the shaft, i.e., from about 33–40% of the contactors surface is immersed in the wastewater. In further accordance with this aspect of the invention the first upstream stage of the system is physically enclosed and the environment above the wastewater level of the first stage is supplied with molecular oxygen to provide and maintain a gaseous composition including more than about 30% preferably at least about 40% and most preferably from about 50 to 70% by volume of molecular oxygen. All gaseous concentrations hereinafter mentioned are percentage by volume of oxygen at atmospheric pressure.

The remaining gaseous components in the enclosed environment are primarily nitrogen evolved from the wastewater and carbon dioxide resulting from the respiration of the biological forms. As will be described in detail hereinafter, the invention defines operating parameters that provide outstanding and unexpected results when at least the first two, preferably the first three stages of a multistage plant are operated in an oxygen enriched atmosphere.

According to the invention, a set of parameters are defined which, when employed in the design of a rotating contactor wastewater treatment plant results in a plant of maximum removal efficiency of $BOD_5$. The set of parameters defined by the invention include the following:

(a) the number of stages of rotating contactors in series. Each stage comprises a single rotatable shaft having a plurality of contactors mounted thereon. The contactors are partially immersed in the wastewater and the wastewater flows in a direction transverse to the shaft, i.e., parallel to the surface of the contactors. At least two stages are provided.

(b) the filtrate $BOD_5$ loading rate applied to each stage of contactors (lbs/day/1,000 sq. ft). The filtrate $BOD_5$ loading rate is preferably substantially the same for each stage, although when the principles of the invention are applied to an existing multistage rotating contactor treatment plant, wherein each stage has about the same surface, the filtrate $BOD_5$ loading rate will inherently decrease in a downstream direction through the plant. Preferably, each stage contains from about 30 to about 70% of the contactor surface of the preceeding stage; chosen to result in about the same filtrate $BOD_5$ loading rate for each stage.

(c) Each stage of the plant has an oxygen enriched atmosphere above the contactors. However, in any stage wherein the filtrate $BOD_5$ loading rate falls below the lower limit of the range defined by the invention as might occur in the application of the principles of the invention to existing plants, as hereinbefore described, oxygen enrichment may not improve BOD$_5$ removal efficiency and therefore oxygen enrichment is not necessary. Similarly, if the filtrate BOD$_5$ loading rate for any stage exceeds the upper limit of the range defined by the invention, oxygen enrichment might be deleterious under certain wastewater temperature conditions and should not be used under those circumstances.

According to this aspect of the invention, the overall contactor surface area for the treatment unit can be minimized by employing an oxygen enriched atmosphere as hereinbefore defined above all stages of a treatment unit having at least three stages of rotating contactors and by maintaining a filtrate BOD$_5$ loading rate of from more than about 3 to about 10, i.e., up to 12 or 13 under certain conditions, preferably about 6 to about 10 in each stage of the treatment unit. The oxygen enriched atmosphere above the contactors preferably contains from about 50 to 70% oxygen. By employing these parameters to new plant design, and/or the upgrading of existing rotating contactor plants, the surface area requirement for a desired BOD$_5$ removal, can be from ⅛ to ½ of that required for the typical multistage treatment plant employing rotating contactors exposed to an ambient atmosphere, or, in the case of an existing plant, the BOD$_5$ removal efficiency can be substantially increased. Most advantageouly, each stage of contactors having an oxygen enriched atmosphere is rotated at a rate of from about 0.6 to about 2.0 RPM, preferably 0.6 to 1.5 RPM, which results in a substantial reduction in the consumption of energy to rotate the contactors relative to the typical rotating contactor plant and produces optimum results according to the invention.

A further advantage of the invention is a range of wastewater immersion times for any point on the contactor surface that maximizes the metabolism of the growing organisms. According to this advantage, the immersion time of the contactors should be chosen so that virtually all of the oxygen picked up by the organisms when exposed to the gaseous atmosphere above the contactors is consumed by their respiration but not so long as to result in suffocation of the organisms at any point during immersion in the wastewater. In other words, the organisms at any point on the contactors should be submerged for the period of time necessary to consume all of the molecular oxygen contained by the slime at that point. If submerged longer than that time some organisms will suffocate thereby reducing the efficiency of the system and if submerged for less than this optimum time, the slimes cannot pick up a maximum amount of oxygen from the gaseous environment upon exposure. Preferred immersion times, according to the invention, are from about 15 to about 60 seconds preferably about 30 seconds with a gaseous environment containing from about 40 to about 80% oxygen by volume.

A still further unexpected advantage of the invention is an increase of the absorption rate of oxygen into the slimes on the contactor surface due primarily to a reduced amount of nitrogen stripping from the wastewater into the gaseous environment above the contactors. The reduced nitrogen stripping is believed to be a result of the relatively low rotational speed of the contactors and reduced mixing of or turbulence in the wastewater. The relatively low rotational speed of the contactors thereby maximizes the concentration of molecular oxygen in the gaseous environment to which the contactors are exposed under given conditions and thus increases the efficiency of oxygen pick-up by the slimes.

BRIEF DESCRIPTION OF THE DRAWING

The invention will be described in further detail with reference to the accompanying drawing in which.

DESCRIPTION OF PREFERRED EMBODIMENTS

Figure 1:
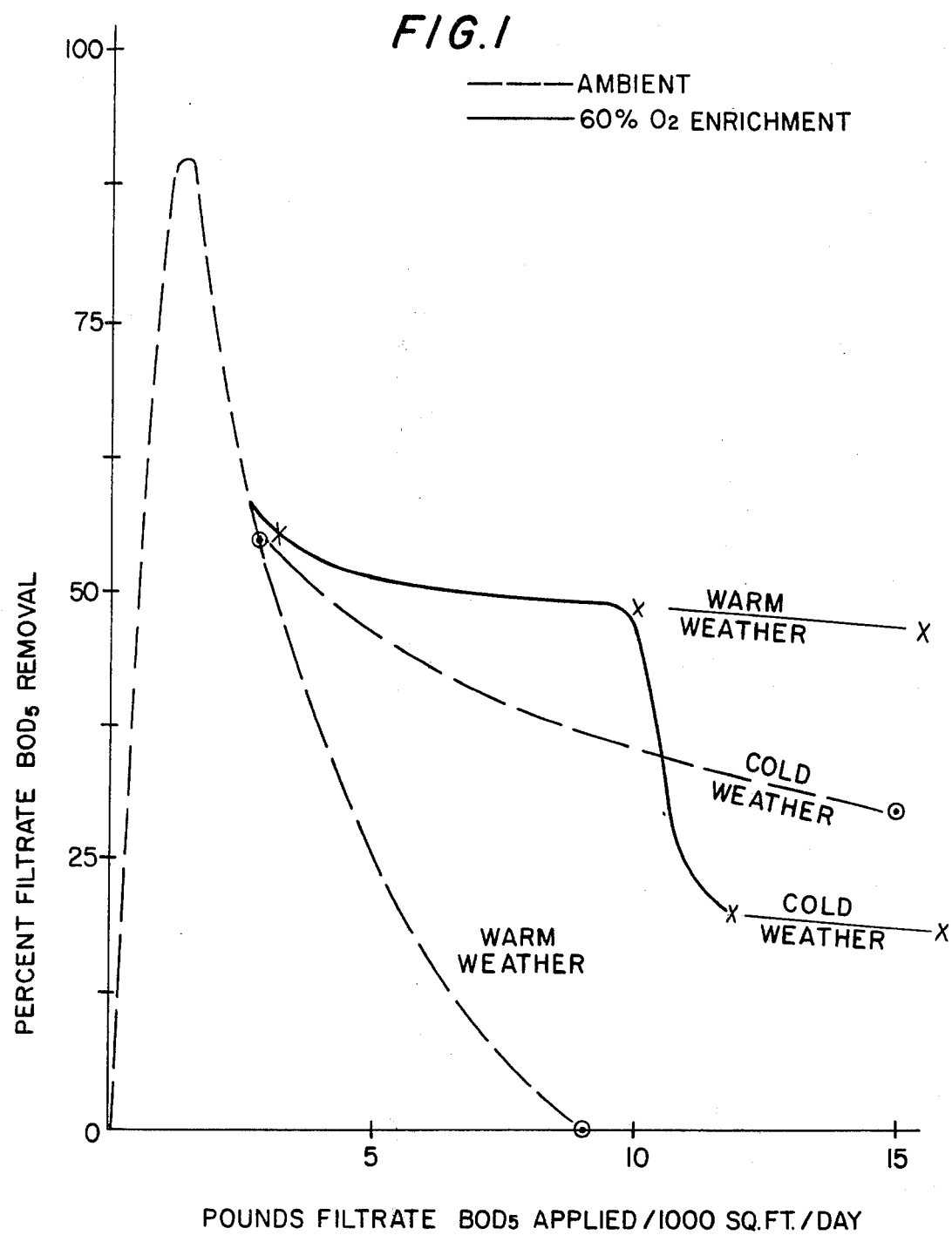
FIG. 1 is a series of curves showing the relationship in any stage of a multistage rotating contactor treatment plant between the filtrate BOD$_5$ loading rate and BOD$_5$ removal efficiency for ambient and oxygen enriched conditions at rotational velocities of about 1.5 RPM and for warm and cold weather conditions.

Referring to FIG. 1, a series of curves illustrating the percent of filtrate BOD$_5$ removed as a function of filtrate BOD$_5$ loading rate at ambient oxygen conditions, i.e., air and a 60% oxygen content in the gaseous atmosphere above the contactors for both cold and warm weather is shown. By warm weather, a wastewater temperature of greater than about 60° F. is meant, as for example 65–75° F.; correspondingly, the expression cold weather indicates a wastewater temperature of less than above 60° F., as for example 50–55° F.

As shown in FIG. 1, up to a filtrate BOD$_5$ loading rate of about 3, the percent filtrate BOD$_5$ removed in any stage of a multistage rotating contactor treatment unit is the same whether or not the gaseous atmosphere above the contactors is enriched with oxygen. The filtrate BOD$_5$ removal efficiency of the stage is also independent of the wastewater temperature at loading rates of about 3 or less, i.e., removal efficiency is the same in warm and cold weather.

At loading rates above about 3, the filtrate BOD$_5$ removal efficiency of a treatment stage varies greatly as a function of the oxygen content of the gaseous atmosphere above the contactors and the wastewater treatment, i.e., above or below about 60° F. Under ambient conditions, i.e., air and treating wastewater in warm weather, the removal efficiency of the treatment stage decreases rapidly and approaches zero at a loading rate of about 9. This is due in large part to the rapid growth of filamenteous organisms on the contactor surface during warm weather, that prevent the growth of organisms that consume carbonaceous matter. Under cold weather ambient conditions the removal efficiency drops as the loading rate increases but at a much lesser rate than in warm weather.

The effect of oxygen enrichment of the gaseous atmosphere above the contactors is shown by the solid line curves of FIG. 1. During warm weather, oxygen enrichment produces a significant improvement in filtrate BOD$_5$ removal efficiency relative to both warm weather and cold weather operation under ambient conditions.

The curve for cold weather operation under oxygen enriched conditions coincides with the corresponding warm weather curve up to a filtrate BOD$_5$ loading rate of about 10 and then, quite surprisingly drops off drastically and levels off again at a loading rate of about 12 to 13 and a filtrate BOD$_5$ removal rate of about 20%. Reference to FIG. 1 clearly shows that for year-round operation of a multistage rotating contactor treatment plant, maximum BOD$_5$ removal efficiency is realized per unit of contactor surface area only when the unit is operated at a filtrate BOD$_5$ loading rate from about 3 to about 10 with an oxygen enriched temperature above the contactors, i.e., 40–70% oxygen. The higher loading rates, i.e., about 6 to about 10 are preferred, since the removal efficiency is only slightly less than at lower loading rates and the contactor surface area saved is substantial.

Figure 2:
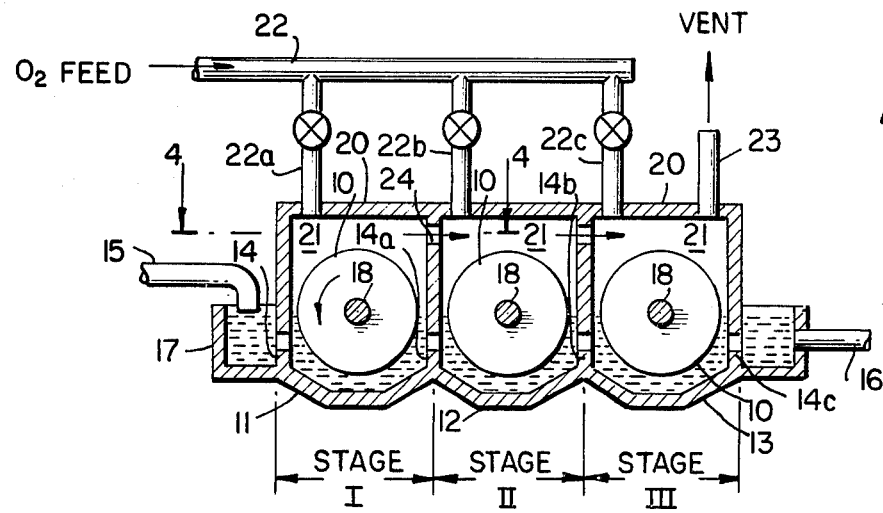
FIG. 2 is a schematic cross-sectional elevational view of a multistage rotating contactor wastewater treatment plant employing principles of the invention.
Figure 4:
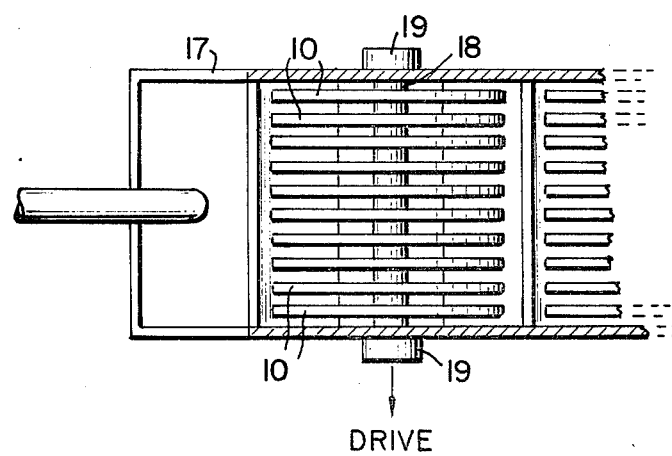
FIG. 4 is a partial cross-sectional plan view of Stage 1 taken along line 4—4 of FIG. 2.

Referring to FIGS. 2 and 4, a wastewater treatment plant employing a multistage arrangement of rotating biological contactors in at least three stages is shown. The treatment plant shown in FIG. 2 includes multiple stages of contactor assemblies each of which is disposed in a trough like tank 11–13, having a bottom generaly configured to the periphery of the contactors. The multiple stages are operated in series with the wastewater successively flowing through each contactor assmebly as it travels from the inlet 15 to the outlet 16.

Presettled or fine screened and degritted wastewater is supplied to distribution chamber 17 through inlet conduit 15 and flows into the Stage 1 tank 11 uniformly across its width over weir 14. From tank 11 the wastewater successively flows through tanks 12 and 13 through submerged openings 14a, b and c to outlet conduit 16 by which it is removed for subsequent treatment if desired.

Each of the tanks 11–13 includes a rotatable shaft 18 supported by bearings 19 (FIG. 4) which are connected to an appropriate drive mechanism for rotating shafts 18. Each shaft 18 supports a plurality of contactors 10 that are mounted transverse to the axis of the shaft and uniformly spaced along its length.

The contactors 10 are typically disc-like in configuration and can be fabricated from any suitable metallic or plastic materials. They are preferably from 10 to 14 feet in diameter; spaced from about ½ to 1 inch apart on shaft 18 and are submerged in the wastewater ⅓ to ⅔ of their diameter during use, although it is preferred to submerge less than ½ of the contactor diameter and provide appropriate gas seals around the shafts.

Each of the three stages I, II and III of the plant shown in FIG. 2 includes a physical barrier or enclosure 20 to isolate the space 21 immediately above the wastewater level from the atmosphere. The space 21 to which the surface of the contactors are periodically exposed to during operation is maintained at atmospheric pressure and enriched with molecular oxygen by supplying oxygen through gas conduit 22. The percentage of oxygen in the spaces 21 is progressively lowered as the gas flows cocurrently with the wastewater towards vent 23. A gaseous composition including at least about 30 to about 70, preferably at least about 40 to about 70% by volume of oxygen is maintained in the spaces 21. The balance of the gaseous composition in the spaces 21 is primarily nitrogen and carbon dioxide.

The oxygen is supplied to each of stages I, II and III by feed lines 22a, b and c each of which include a valve means for regulating the flow of oxygen into space 21 of each individual stage. Alternatively, oxygen may only be supplied to space 21 of stage I and the oxygen enriched atmosphere caused to flow from stage I to stage II to stage III through passageways 24 and 25 to the outlet vent 23. In any case, the outlet vent should be monitored so that the outflowing gas has an oxygen content in the range of 30 to 50%.

In a preferred mode of operation, wastewater is supplied to stage I at a loading rate of from about 6 to about 10 lbs of filtrate BOD$_5$ per day per 1,000 sq. ft. of contactor surface area in stage I. The stage I removes from about 45 to 55% of the filtrate BOD$_5$ applied and the stage II contactor assembly is sized to provide a filtrate BOD$_5$ loading rate between about 6 and 10 preferaby about the same as the loading rate in stage I. The stage II removes from about 45 to 55% of the remaining BOD$_5$. Similarly, the contactor assembly of stage III is sized to provide a filtrate BOD$_5$ loading rate between about 6 and 10 preferably about the same as that of stages I and II. The stage III removes about 45 and 55% of the remaining BOD$_5$ resulting in an overall BOD$_5$ removal of about 90%.

According to this aspect of the invention, the contactor assemblies of each of stages I, II and III are rotated at a rate of from about 0.6 to about 1.5 RPM. The stage II preferably has a contactor surface area of from about 40 to about 60% of the contactor surface area of stage I and stage III preferably has from about 40% to about 60% of the contactor surface area of stage II in order to maintain substantially the same filtrate BOD$_5$ loading rate (lbs/day/1,000 sq. ft.) in each stage.

For example, the treatment unit described in Table A can be used to remove about 87% BOD$_5$ from 1,000,000 gallons per day or normal domestic wastewater containing an average of about 580 pounds of filtrate BOD$_5$ per day.

TABLE A

|  | Stage I | Stage II | Stage III |
|---|---|---|---|
| Contactors Surface Area (sq. ft.) | 58,000 | 29,000 | 14,500 |
| Contactor RPM | 0.6 to 1.0 | 8.0 to 1.2 | 1.0 to 1.5 |
| O$_2$ Content of Space 21 (%) | 70 | 60 | 50 |
| Filtrate BOD$_5$ Removal (%)* | 50 | 50 | 50 |
| Filtrate BOD$_5$ Removal (lbs/day) | 290 | 145 | 72 |
| Filtrate BOD$_5$ Loading Rate (lbs/day/1,000 sq.ft.) | 10 | 10 | 10 |
| Wastewater Temperature: 50° F. to 75° F. | | | |

*Based on influent to each stage

The treatment unit described in Table A employs 101,500 sq. ft. of contactor surface in the form of discs mounted on rotatable shafts. The discs are preferably spaced about ¾ inch apart on the shafts. The discs are rotated at 1.5 RPM or less and remove 87% BOD$_5$ filtrate BOD$_5$ from 1,000,000 gallons per day of normal domestic wastewater, with a 50 to 70% oxygen atmosphere above the contactors.

A typical multistage rotating contactor treatment unit operating without oxygen enrichment would require about three times the surface area, i.e. 300,000 sq. ft. of contactor surface area, to effect the same degree of removal. Further, the typical prior art unit would operate at a higher RPM than the treatment unit described in Table A and consume much more energy which varies as an exponential function of the rotational rate.

The oxygen consumption of the treatment plant of Table A is approximately 120% of the filtrate BOD$_5$ removal, on a weight basis. The oxygen consumption comprises the actual amount of oxygen used by the organisms (about 1 pound per pound of filtrate BOD$_5$ removed), the vent gas loss and the amount dissolved in the effluent wastewater.

Figure 3:
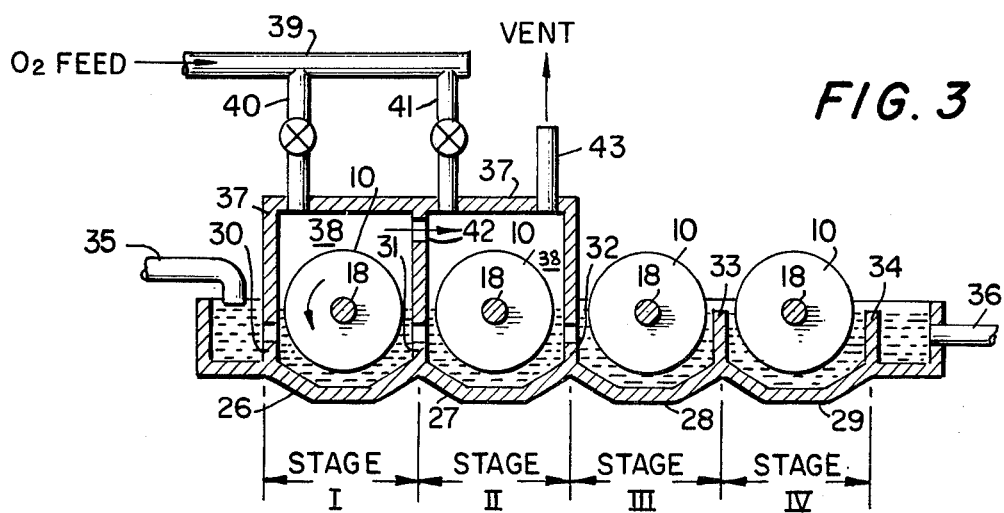
FIG. 3 is a schematic cross-sectional view of a second embodiment of a multistage wastewater treatment plant according to the invention.

The embodiment shown in FIG. 3 of the drawing illustrates how the principles of the invention can be applied to a multistage rotating contactor treatment plant employing substantially the same amount of contactor surface area in each stage. Such a plant is typical of rotating contactor treatment plants presently in use and the invention provides a simple and economical means for substantially upgrading the $BOD_5$ removal efficiency or capacity of such a plant.

The plant shown in FIG. 3 includes four treatment stages, each stage comprising a through like tank 26-29 containing a contactor assembly. The multiple stages are operated in series with the wastewater successively flowing through each stage through submerged openings 31 and 32 and over weirs 33 and 34 from the inlet 35 to the outlet 36. The contactor assemblies shown in FIG. 3 are similar in construction and operation to those of the treatment unit shown in FIG. 2 and hereinabove described. Each of the contactor assemblies of stages I, II, III and IV of FIG. 3 has about the same contactor surface area as would be found in typical prior art rotating contactor treatment plants.

According to this aspect of the invention, a rotating contactor treatment plant of the type shown in FIG. 3, can be substantially upgraded by providing oxygen enrichment to at least the first two stages of the plant according to the principles of the invention. Stated differently, oxygen enrichment is provided to each stage of the plant wherein the filtrate $BOD_5$ loading rate is from about 3 to about 10. As can be readily seen from the curves of FIG. 1, the advantages of the invention in this regard are particularly significant during warm weather operation. During cold weather operation an economic judgment might be made to operate without oxygen enrichment, depending of course on the cost of oxygen and the load the plant must handle.

Accordingly, each of the first two stages of the treatment unit of FIG. 3 includes a physical barrier or enclosure 37 to define and isolate from the atmosphere space 38 immediately above the wastewater level of each stage. Each of the spaces 38, to which the surface of the contactors are periodically exposed to during operation, is maintained at atmospheric pressure and enriched with molecular oxygen by supplying oxygen through gas conduits 39, 40 and 41. The oxygen is usually supplied to space 38 by conduit 40. Communication between spaces 38 of stages I and II is provided by gas flow orifice 42. Gasses are removed from space 38 through vent conduit 43. The vent gasses should be in the range of 40 to 50% to conserve oxygen wastage which should not be more than about 10% of the supply.

The method of the invention, as applied to the upgraded treatment plant provides an economical means to overcome the operating limitations of the plant by supplying an oxygen enriched atmosphere above at least the first two stages of the plant, i.e., those stages wherein the filtrate $BOD_5$ loading rate is from about 3 to about 10. The third and fourth stages inherently will have filtrate $BOD_5$ loading rates less than about 3 and need not be operated in an oxygen enriched atmosphere. Optionally, the oxygen enrichment to stages I and II may be terminated during cold weather when the particular loading conditions justify such change after referring to FIG. 1.

Further, and as pointed out in relation to the plant described in Table A, a prior art non-oxygen enriched plant would also operate at a contactor rotational rate of about 3 RPM as opposed to the 1.5 RPM or less rotational rate taught by the invention. Since the energy consumed in rotating the contactor is an exponential function of the RPM, the low contactor rotational rates of the invention provide the additional benefit of significant savings in energy consumption, which can be applied to offset the cost of the oxygen required by the new process.

The invention has been described in terms of and with reference to preferred embodiments that are meant to be illustrative and not limiting of the scope of the invention. Accordingly, reference should be made to the following appended claims in determining the full scope of the invention.

I claim:

1. A method of treating wastewater containing filtrate $BOD_5$ and at a wastewater temperature of less than 60° F., comprising the steps of:
   (a) supplying said wastewater to a first stage biological treatment unit at a first loading rate,
   (b) supplying the effluent wastewater from said first stage biological treatment unit to a second stage biological treatment unit at a second loading rate,
   (c) said first and second stages employing rotatable biological contactors having surface area for the growth and maintenance of biological slimes,
   (d) said second stage including at least about 30% to not more than about 70% of the contactor surface area of said first stage,
   (e) rotating said biological contactors of said first and second stages at a predetermined rotational rate of between 0.6 and 2.0 RPM to alternately expose said surface area to a gaseous atmosphere and to grow and maintain biological slimes on said surface area,
   (f) said gaseous atmosphere comprising from about 30% to about 80% oxygen by volume,
   (g) said first and second loading rates, expressed as pounds of filtrate $BOD_5$ per day per 1,000 square feet of contactor surface, being from about 6 to about 10.

2. In the method of treating wastewater having a temperature of less than 60° F. including the steps of supplying wastewater including filtrate $BOD_5$ to a multistage treatment plant including at least three treatment stages in series, each stage employing a rotatable biological contactor having surface area for the growth and maintenance of biological slimes, rotating said contactors at a predetermined rotational rate to alternately expose said surface area to a gaseous atmosphere and said wastewater, the improvement wherein said wastewater is applied to the first and second stages at a filtrate $BOD_5$ loading rate from about 6 to about 10 and said gaseous atmosphere above said first and second stages include at least about 40% oxygen, said predetermined rotational rate is between 0.6 and 2.0 RPM, and wherein said second stage includes at least about 30% to not more than about 70% of the contactor surface area of said first stage and said third stage includes at least about 30% to not more than about 70% of the contactor surface area of said second stage.

* * * * *